United States Patent
Delaforge

(10) Patent No.: US 9,194,614 B2
(45) Date of Patent: Nov. 24, 2015

(54) AIR-CONDITIONING LOOP PROVIDED WITH A SOLENOID VALVE AND OPERATING AS A HEAT PUMP

(75) Inventor: Laurent Delaforge, Orcemont (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 416 days.

(21) Appl. No.: 13/988,185

(22) PCT Filed: Nov. 15, 2011

(86) PCT No.: PCT/EP2011/070110
§ 371 (c)(1),
(2), (4) Date: Jul. 17, 2013

(87) PCT Pub. No.: WO2012/065972
PCT Pub. Date: May 24, 2012

(65) Prior Publication Data
US 2013/0283850 A1 Oct. 31, 2013

(30) Foreign Application Priority Data
Nov. 19, 2010 (FR) ..................... 10 04504

(51) Int. Cl.
*F25B 1/00* (2006.01)
*B60H 1/00* (2006.01)
*F25B 41/04* (2006.01)
(Continued)

(52) U.S. Cl.
CPC .............. *F25B 1/00* (2013.01); *B60H 1/00921* (2013.01); *F25B 41/04* (2013.01); *F25B 6/02* (2013.01); *F25B 13/00* (2013.01); *F25B 39/00* (2013.01);
(Continued)

(58) Field of Classification Search
CPC ..... B60H 1/00371; F25B 39/00; F25B 39/04; F25B 41/062; F25B 13/00
USPC .................... 62/239, 244, 498, 503, 513, 515
See application file for complete search history.

(56) References Cited

U.S. PATENT DOCUMENTS 5,421,169 A * 6/1995 Benedict .................... 62/244
6,804,976 B1 10/2004 Dain
(Continued)

FOREIGN PATENT DOCUMENTS

| EP | 1519126 A2 | 3/2005 |
| FR | 2886388 A1 | 12/2006 |
| FR | 2916835 A1 | 12/2008 |

OTHER PUBLICATIONS

English language abstract and translation for FR 2886388 extracted from espacenet.com on Oct. 23, 2013, 12 pages.
(Continued)

*Primary Examiner* — Melvin Jones
(74) *Attorney, Agent, or Firm* — Howard & Howard Attorneys PLLC

(57) ABSTRACT

An air-conditioning loop, in which a refrigerant flows, is capable of operating as a heat pump. The air-conditioning loop includes a compressor. The air-conditioning loop further includes a first solenoid valve connected to the compressor, to a radiator, and to an external heat exchanger. The radiator is connected to the external heat exchanger via a first pressure-release device and to an evaporator via a second pressure-release device. The evaporator is connected to the compressor. The external heat exchanger is connected to the compressor and to the evaporator via a second solenoid valve. The external heat exchanger, the first solenoid valve, and the second solenoid valve constitute a unitary part.

13 Claims, 2 Drawing Sheets

(51) Int. Cl.
*F25B 6/02* (2006.01)
*F25B 13/00* (2006.01)
*F25B 39/00* (2006.01)

(52) U.S. Cl.
CPC ... *F25B 2313/02732* (2013.01); *F25B 2500/18* (2013.01)

(56) References Cited

U.S. PATENT DOCUMENTS

2004/0134216 A1* 7/2004 Heyl ........................... 62/324.1
2005/0103487 A1* 5/2005 Aflekt et al. ................. 165/202
2008/0314064 A1* 12/2008 Al-Eidan ..................... 62/324.6

OTHER PUBLICATIONS

English language abstract and translation for FR 2916835 extracted from espacenet.com on Oct. 23, 2013, 11 pages.

International Search Report for Application No. PCT/EP2011/070110 dated Dec. 1, 2011, 5 pages.

* cited by examiner

AIR-CONDITIONING LOOP PROVIDED WITH A SOLENOID VALVE AND OPERATING AS A HEAT PUMP

RELATED APPLICATIONS

This application is the National Stage of International Patent Application No. PCT/EP2011/070110, filed on Nov. 15, 2011 which claims priority to and all the advantages of French Patent Application No. FR 10/04504, filed on Nov. 19, 2010, the content of which is incorporated herein by reference.

The invention relates to air conditioning loops for motor vehicles and in particular to air conditioning loops operating as heat pumps.

In electric motor vehicles, the main source of calories for heating the air in the car interior, namely an internal combustion engine, no longer exists. Indeed, the electric motors of electric vehicles provide only a very few calories. In order to overcome this, the air conditioning loop, normally used for cooling the air in the car interior, is used as a heat pump. Thus, the calories needed for heating the air in the car interior are provided by the coolant fluid circulating inside the air conditioning loop. The compression of the coolant fluid by the compressor of the air conditioning loop increases its temperature and supplies calories to the air passing through a radiator located inside a ventilation, heating and/or air conditioning system.

The use of the air conditioning loop for operation as a heat pump requires modifying the coolant fluid circulation circuit, adding components such as an external heat exchanger and distribution valves. In addition, it is necessary to add a larger number of pipes for connecting the various components of the air conditioning loop and to form a coolant fluid circulation circuit for an air conditioning mode in which the air is cooled and a coolant fluid circulation circuit for a heat pump mode in which the air is heated.

All these additions lead to a high manufacturing cost for the air conditioning loop, significant complexity in the fluid circulation circuit and unsatisfactory bulk of the air conditioning loop.

The present invention aims to overcome these drawbacks by providing an air conditioning loop for a motor vehicle in which a coolant fluid circulates, the air conditioning loop being capable of operating as a heat pump and including a compressor, a first solenoid valve connected to the compressor, to a radiator and to an external heat exchanger, the radiator being connected to the external heat exchanger via a first expansion device, and connected to an evaporator via a second expansion device, the evaporator being connected to the compressor, the external heat exchanger being connected to the compressor and to the evaporator via a second solenoid valve, characterized in that the external heat exchanger, the first solenoid valve and the second solenoid valve form a unitary part.

The unitary nature of the external heat exchanger and the two solenoid valves has the advantage of reducing the number of pipes in the air conditioning loop, thus reducing its cost and its bulk. In addition, the unitary part that is formed by the external heat exchanger and the two solenoid valves simplifies the coolant fluid circulation circuit inside the air conditioning loop and thus reduces pressure loss in the coolant fluid.

For example, by directly connecting the second solenoid valve to the external heat exchanger, the pipe connecting the fluid outlet of this heat exchanger with the fluid inlet of a valve is eliminated. Due to the fact that the air conditioning loop operates either in heat pump mode or in cooling mode, this pipe receives from the external heat exchanger either coolant fluid at low pressure and in the gaseous state (heat pump mode), or coolant fluid at high pressure and in the liquid state (cooling mode). As a result, this pipe must be structurally suitable for receiving fluid at high pressure and at low pressure, involving an additional cost compared to the invention in which all the pipes are only suitable for a single fluid state. Finally, by eliminating pipes and simplifying the coolant fluid circulation circuit, the path of the coolant fluid is reduced inside the air conditioning loop. The density of the fluid in liquid phase being higher than in gaseous phase, it is advantageous to reduce or even eliminate the volume of the pipe at the outlet of the external exchanger, common to both modes. Thus, the quantity of coolant fluid inside the air conditioning loop is reduced and leads to an economic and environmental saving.

According to a first feature of the invention, the first expansion device is integrated into the first solenoid valve.

According to another feature of the invention, the evaporator and the second expansion device form a unitary block.

According to yet another feature of the invention, the first and second expansion devices are electronic expansion valves.

Other features, details and advantages of the invention will become clearer upon reading the following description given as a guide in relation to the drawings in which.

Figure 1:
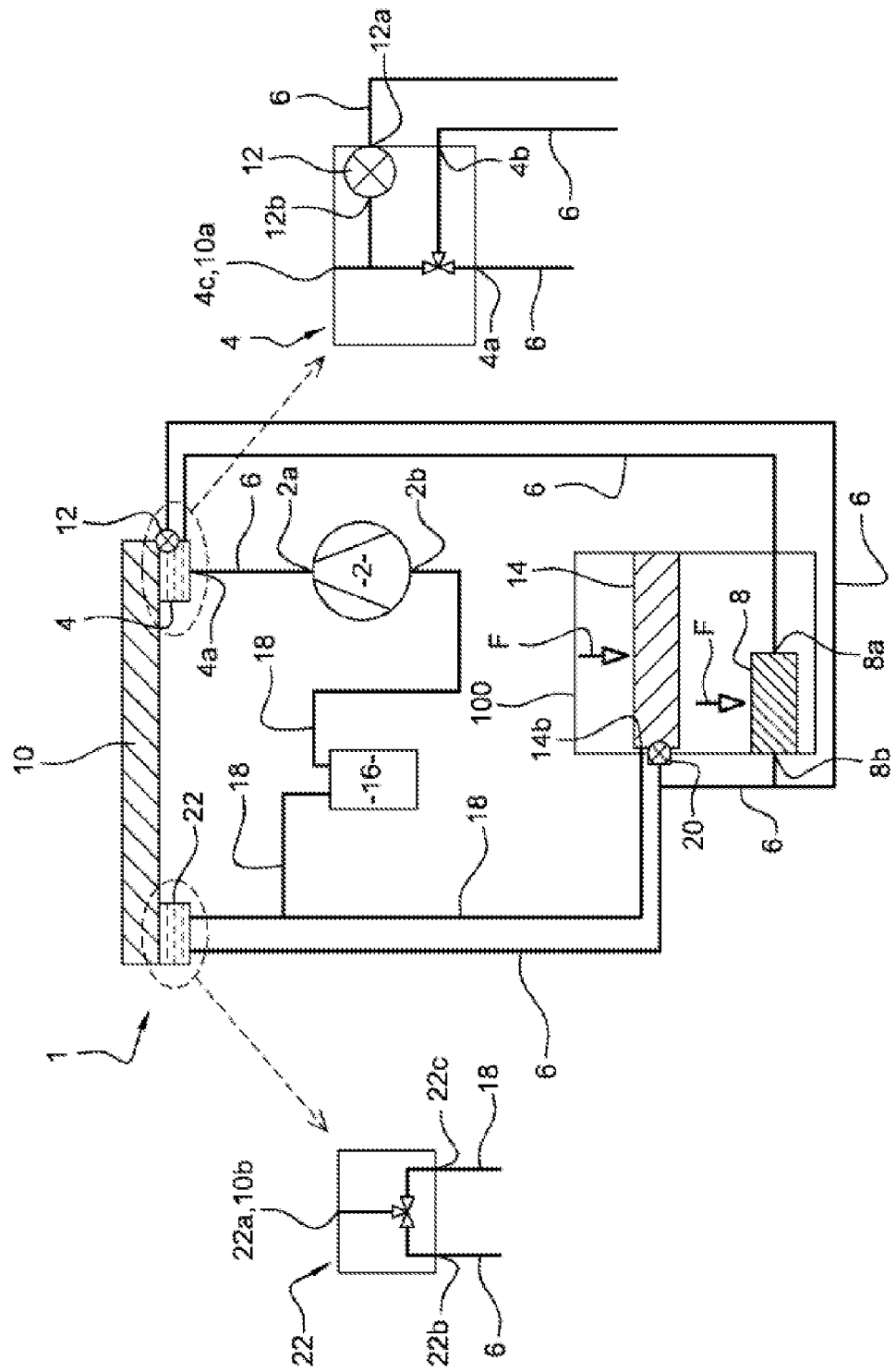
FIG. 1 is a diagram of the air conditioning loop according to the invention.

FIG. 1 depicts an air conditioning loop 1 according to the invention including a compressor 2 connected to a first solenoid valve 4 via a high pressure pipe 6. More specifically, an outlet 2a of the compressor 2 is connected to a high pressure inlet 4a of the first solenoid valve 4. "High pressure" is understood to mean that the coolant fluid is in a state of high pressure due to its compression by the compressor 2.

The first solenoid valve 4 is connected to a radiator 8, a first expansion device 12 and to an external heat exchanger 10. The first expansion device 12 is an electronic expansion valve. "Electronic expansion valve" is understood to mean an expansion valve provided with an expansion orifice in which the variation in flow area is controlled electronically. In addition, such an expansion valve also completely closes its expansion orifice so as to prevent any coolant fluid from flowing through the expansion valve. The electronic expansion valve is controlled by a control law specific to the heat pump mode or to the cooling mode. A high pressure pipe 6 connects a high pressure outlet 4b of the first solenoid valve 4 to a high pressure inlet 8a of the radiator 8. Located inside a ventilation, heating and/or air conditioning system 100, the radiator 8 heats the air F being directed towards the car interior, not shown.

The coolant fluid exiting from the radiator 8 through a high pressure outlet 8b then reaches a high pressure pipe 6 then a second expansion device 20. Enabling the coolant fluid to lower its pressure, the second expansion device 20 is an electronic expansion valve. "Electronic expansion valve" is understood to mean an expansion valve provided with an expansion orifice wherein the variation in flow area is controlled electronically. In addition, such an expansion valve also completely closes its expansion orifice so as to prevent any coolant fluid from flowing through the expansion valve. The second expansion device 20 is connected to an evaporator 14 for cooling the air F and located inside the ventilation, heating and/or air conditioning system 100. In order to reduce the number of pipes in the air conditioning loop 1, the second expansion device 20 forms a unitary block with the evaporator 14. In other words, the coolant fluid passing through the second expansion device 20 reaches the evaporator 14 without circulating through a pipe. In this way, the second expansion device 20 is directly connected to the evaporator 14. More specifically, a low pressure outlet of the second expansion device 20 is directly connected to the low pressure inlet of the evaporator 14.

The evaporator 14 is connected via a low pressure outlet 14b, to an accumulator 16, itself connected to an inlet 2b of the compressor 2. The fluidic connection between the evaporator 14, the accumulator 16 and the compressor 2 is implemented via low pressure pipes 18. "Low pressure" is understood to mean that the fluid passing through these pipes is in a state of low pressure due to the fact of its expansion through an expansion device.

The first expansion device 12 is also connected at the high pressure outlet 8b of the radiator 8 via a high pressure pipe 6. This first expansion device 12 is an electronic expansion valve. Integrated directly into the first solenoid valve 4, the first expansion device 12 enables the coolant fluid to circulate from the radiator 8 towards the external heat exchanger 10.

The external heat exchanger 10 and the first solenoid valve 4 form a unitary part. "Unitary" is understood to mean that the external heat exchanger 10 and the first solenoid valve 4 are inseparable from one another and no pipe is necessary for conveying the coolant fluid from the first solenoid valve 4 towards the external heat exchanger 10. The latter 10 includes a fluid inlet 10a directly connected to an outlet 4c of the first solenoid valve 4.

So as to reduce the number of pipes in the air conditioning loop 1 and to simplify the path of the coolant fluid inside the air conditioning loop 1, the first solenoid valve 4 is structured in the following way. The high pressure inlet 4a, receiving the coolant fluid from the compressor 2, is connected to the outlet 4c, an outlet directly connected to the inlet 10a of the external heat exchanger 10. In addition, the first expansion device 12 forming an integral part of the first solenoid valve 4, the inlet 12a of the first expansion device 12, connected to the high pressure outlet 8b of the radiator 8, constitutes a fluid inlet of the first solenoid valve 4 separate from the high pressure inlet 4a. The first expansion device 12 comprises an outlet 12b connected to the outlet 4c of the first solenoid valve 4. Finally, the high pressure inlet 4a is also connected to the high pressure outlet 4b of the first solenoid valve 4. The diameters of the connections 4c and 12b are dimensioned so as to limit the pressure losses at low pressure (heat pump mode). The dimensioning will conform to the dimension of the low pressure pipes. Similarly, the diameters of the connections 4a and 4b will be dimensioned in conformity with the dimensioning of the high pressure pipes.

The first solenoid valve 4 and the first expansion device 12 form a monoblock unit. Thus, the connection between the outlet 12b of the first expansion device 12 and the outlet 4c of the first solenoid valve 4 is not made by an additional pipe of the type used for connecting, for example, the radiator 8 to the first solenoid valve 12 or the evaporator 14 to the accumulator 16. This connection is made inside the first solenoid 4 itself. In the same way, the connection of the high pressure inlet 4a with the high pressure outlet 4b or with the outlet 4c is made inside the first solenoid valve 4.

It should be noted that on the one hand, the connection between the high pressure inlet 4a and the high pressure outlet 4b is configured so as to withstand the pressure values for a coolant fluid under high pressure. On the other hand, the connection between the outlet 4c and the outlet 12b or the high pressure inlet 4a is configured so as to withstand the pressure values for a coolant fluid under high pressure.

The external heat exchanger 10, the first solenoid valve 4 and the first expansion device 12 form a unitary part. Accordingly, the external heat exchanger 10, the first solenoid valve 4 and the first expansion device 12 are mechanically inseparable.

The external heat exchanger 10 is located inside the vehicle at the front. "External" is understood to mean that this heat exchanger is not located inside the ventilation, heating and/or air conditioning system 100.

The external heat exchanger 10 includes an outlet 10b connected to an inlet opening 22a of the second solenoid valve 22. The diameters of the outlet 10b and the inlet 22a will be identical and homogeneous with the low pressure pipe 18. Just like the first solenoid valve 4, this second solenoid valve 22 forms a unitary part with the external heat exchanger 10. Thus, the monoblock assembly formed by the external heat exchanger 10, the first solenoid valve 4, the first expansion device 12 and the second solenoid valve 22, serves to reduce the number of pipes used in the air conditioning loop 1 for providing either an air conditioning mode or a heat pump mode.

In particular, the direct connection of the two solenoid valves 12, 22 to the external heat exchanger 10 brings a greater reduction in the number of pipes used in the air conditioning loop 1 than in the case where the solenoid valves are connected to another component of this air conditioning loop 1.

The location of the two solenoid valves 12, 22 on the same side of the external heat exchanger 10 serves to reduce the bulk of the unitary part.

The second solenoid valve 22 includes a high pressure outlet 22b (diameter homogeneous with the high pressure pipe) and a low pressure outlet 22c (diameter homogeneous with the low pressure pipe). The high pressure outlet 22b is connected via a high pressure pipe 6 to the second expansion device 20. The low pressure outlet 22c is connected via a low pressure pipe 18 to the accumulator 16.

The second solenoid valve 22 is directly connected to the external heat exchanger 10. Thus, the external heat exchanger 10, the first solenoid valve 4 and the second solenoid valve 22 form a unitary part.

The high pressure pipes 6 have an internal diameter of between 4 and 8 mm. Preferably, the internal diameter is 6 mm. The low pressure pipes 18 have an internal diameter of between 10 and 16 mm. Preferably, the low pressure pipes have an internal diameter of 12 mm.

The two expansion devices 12, 20 are electronic expansion valves as previously described. The use of electronic expansion valves is preferred over thermostatic expansion valves due to the fact that the expansion orifice of an electronic expansion valve can be closed completely and thus act as a shut-off valve in addition to acting as an expansion valve. In this way, the need is removed for an additional shut-off valve preventing access to certain parts of the air conditioning loop 1 according to its operating mode (normal or heat pump mode).

The operation of the air conditioning loop 1 during heat pump operation will now be explained.

The coolant fluid is placed under high pressure and high temperature as it flows inside the compressor 2. The coolant fluid, exiting from the compressor 2, reaches the first solenoid valve 4 which is controlled so as to convey all the coolant fluid from the compressor 2 towards the radiator 8. In other words, all the coolant fluid from the high pressure inlet 4a is directed towards the high pressure outlet 4b. Thus, not all the fluid under high pressure from the compressor 2 reaches the outlet 4c of the first solenoid valve 4.

During its flow inside the radiator 8, the coolant fluid loses its calories to the air F passing through the radiator 8. Indeed, the radiator then behaves like a condenser or a gas cooler. In order to avoid the coolant fluid at the outlet of the radiator 8 reaching the evaporator 14 via the second expansion device 20, the latter 20 is completely closed and stops any fluid from flowing.

Accordingly, all the coolant fluid passing through the radiator 8 arrives at the first expansion device 12, passes therethrough whilst undergoing expansion, then is conveyed directly towards the external heat exchanger 10 via the outlet 4c. Thus, the outlet 4c receives only fluid under low pressure from the first expansion device 12. In this heat pump mode, the external heat exchanger 10 acts as an evaporator in which the coolant fluid collects calories from the outside air passing through this external heat exchanger 10.

The second solenoid valve 22 is configured so as to prevent any fluid from flowing through the high pressure outlet 22b and to allow all the coolant fluid to circulate towards the accumulator 16 via the low pressure outlet 22c. At the outlet of the accumulator 16, the coolant fluid is conveyed towards the compressor 2 for beginning a new thermodynamic cycle. The complete closure of the second expansion device 20 prevents the fluid from flowing from the second solenoid valve 22 towards the evaporator 14.

The operation of the air conditioning loop 1 during a defrosting mode will now be explained.

During the heat pump mode, there is a problem of the external heat exchanger 10 icing up. In this regard, since the external heat exchanger 10 acts as an evaporator, there is a risk that the water droplets carried by the outside air condense on the surface of the external heat exchanger 10 and form ice. This means that the outside air cannot pass through the external heat exchanger 10 and that heat exchange between the outside air and the coolant fluid no longer takes place. The performance of the air conditioning loop 1 is then degraded.

In order to overcome this, the first solenoid valve 4 is used so as to distribute the coolant fluid both towards the radiator 8 and towards the external heat exchanger 10. Sharing coolant fluid flows between the radiator 8 and the external heat exchanger 10 serves to raise the value of the low pressure in the external heat exchanger 10 for defrosting while warming the cooled air downstream from the evaporator 14. Accordingly, the coolant fluid under high pressure and at high temperature passes through the external heat exchanger 10 and exchanges its calories with the frosted water on the surface of the external heat exchanger 10. The calories transferred to the water enable this water to pass into the liquid state and finally enable the outside air to flow through the external heat exchanger 10.

The coolant fluid reaching the radiator 8 exchanges its calories with the air F for heating it inside the ventilation, heating and/or air conditioning system 100. Then, the coolant fluid circulates through the second expansion device 20 then passes through the evaporator 14. Finally, exiting from the evaporator 14, the coolant fluid passes through the accumulator 16 then returns to the compressor 2.

The coolant fluid passing through the external heat exchanger 10 travels through the second solenoid valve 22 and exits completely via the high pressure outlet 22b to reach the second expansion device 20. Next, the coolant fluid flows inside the evaporator 14 then the accumulator 16 and returns to the compressor 2.

It is understood that with such an operating mode, the first expansion device 12 is completely closed, thus preventing the coolant fluid from flowing from the radiator 8 towards the external heat exchanger 10. In addition, the second solenoid valve 22 is configured so as to prevent any fluid from flowing through the low pressure outlet 22c for stopping the fluid exiting from the outdoor heat exchanger 10 from reaching the accumulator 16.

The operation of the air conditioning loop 1 during a cooling mode will now be explained.

In this mode, the air conditioning loop operates so as to cool the air F inside the ventilation, heating and/or air conditioning system 100.

The compressor 2 compresses the coolant fluid and sends it towards the first solenoid valve 4. The latter 4 is configured so as to allow the coolant fluid to flow towards the external heat exchanger 10 and to prevent it flowing towards the radiator 8.

In flowing into the external heat exchanger 10, the coolant fluid exchanges its calories with the outside air. Thus, the external heat exchanger 10 acts as a condenser or a gas cooler. The coolant fluid then flows inside the second solenoid valve 22. The latter 22 is configured so as to allow the coolant fluid to flow towards the second expansion device 20 and to prevent any flow towards the accumulator 16.

On circulating inside the second expansion device 20, the coolant fluid undergoes expansion then reaches the evaporator 14 to collect calories from the air F. On exiting from the evaporator 14, the fluid is conveyed towards the accumulator 16 and cannot reach the external heat exchanger 10 due to the fact that the low pressure outlet 22c of the second solenoid valve 22 is completely closed. On exiting from the accumulator 16, the coolant fluid returns towards the compressor 2.

In this mode, the first expansion device 12 is therefore completely closed and the first solenoid valve 4 is configured so as to prevent any coolant fluid from flowing through the high pressure outlet 4b.

The operation of the air conditioning loop 1 during a dehumidification mode will now be explained.

The coolant fluid passes through the compressor 2 to reach a state of high pressure then travels through the first solenoid valve 4. The latter 4 is configured so as to allow all the coolant fluid to be directed towards the radiator 8.

The coolant fluid is discharged of its calories as it flows inside the radiator 8 then arrives at the second expansion device 20 in which it undergoes expansion. Next, the coolant fluid collects calories from the air F traveling through the evaporator 14 then is conveyed towards the accumulator 16 and finally returns to the compressor 2.

In this operating mode, the first expansion device 12 is completely closed in order to prevent access to the coolant fluid exiting from the radiator 8 towards the external heat exchanger 10. The first solenoid valve 4 is also configured so as to prevent any coolant fluid from flowing towards the outlet 4c. In addition, the high pressure outlet 22b and low pressure outlet 22c of the second solenoid valve 22 are completely closed in order to prevent a return of coolant fluid towards the external heat exchanger 10 through the second solenoid valve 22.

Figure 2:
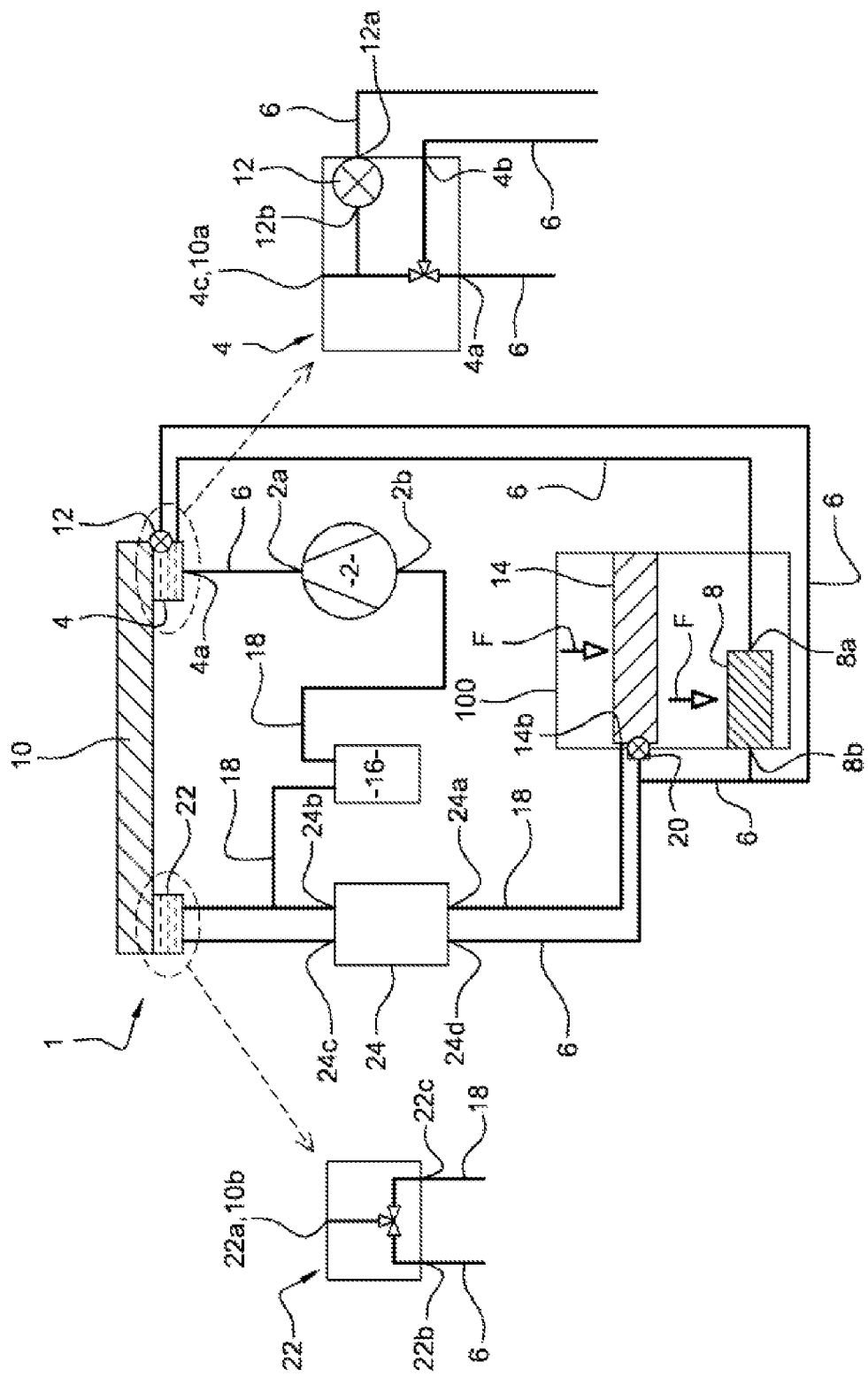
FIG. 2 is a diagram of a variant embodiment of the air conditioning circuit according to the invention.

FIG. 2 illustrates a variant embodiment of the air conditioning loop according to the invention.

According to this variant, the air conditioning loop includes an internal heat exchanger 24. This internal heat exchanger 24 is used for a heat exchange between the coolant fluid under high pressure and the coolant fluid under low pressure. This internal heat exchanger 24 serves to improve the coefficient of performance of the air conditioning loop 1. The internal heat exchanger 24 includes a low pressure inlet 24a that receives coolant fluid from the evaporator 14 and a low pressure outlet 24b connected to the accumulator 16. In addition, the internal heat exchanger includes a high pressure inlet 24c that receives fluid from the high pressure outlet 22b of the second solenoid valve 22 and a high pressure outlet 24d connected to the second expansion device 20.

The invention claimed is:

1. An air conditioning loop (1) for a motor vehicle in which a coolant fluid circulates, the air conditioning loop (1) including:
   a compressor (2); and
   a first solenoid valve (4) connected to the compressor (2), to a radiator (8), and to an external heat exchanger (10);
   wherein the radiator (8) is connected to the external heat exchanger (10) via a first expansion device (12) and is connected to an evaporator (14) via a second expansion device (20);
   wherein the evaporator (14) is connected to the compressor (2);
   wherein the external heat exchanger (10) is connected to the compressor (2) and to the evaporator (14) via a second solenoid valve (22); and
   wherein the external heat exchanger (10), the first solenoid valve (4), and the second solenoid valve (22) form a unitary part.

2. The air conditioning loop (1) as claimed in claim 1, wherein the first expansion device (12) is integrated into the first solenoid valve (4).

3. The air conditioning loop (1) as claimed in claim 1, wherein the evaporator (14) and the second expansion device (20) form a unitary block.

4. The air conditioning loop as claimed in claim 1, wherein the first (12) and second (20) expansion devices are electronic expansion valves.

5. The air conditioning loop (1) as claimed in claim 2, wherein the evaporator (14) and the second expansion device (20) form a unitary block.

6. The air conditioning loop as claimed in claim 5, wherein the first (12) and second (20) expansion devices are electronic expansion valves.

7. The air conditioning loop as claimed in claim 2, wherein the first (12) and second (20) expansion devices are electronic expansion valves.

8. The air conditioning loop as claimed in claim 3, wherein the first (12) and second (20) expansion devices are electronic expansion valves.

9. The air conditioning loop as claimed in claim 1, further including an accumulator (16) connected to the evaporator (14) and the compressor (2).

10. The air conditioning loop as claimed in claim 2, further including an accumulator (16) connected to the evaporator (14) and the compressor (2).

11. The air conditioning loop as claimed in claim 3, further including an accumulator (16) connected to the evaporator (14) and the compressor (2).

12. The air conditioning loop as claimed in claim 4, further including an accumulator (16) connected to the evaporator (14) and the compressor (2).

13. The air conditioning loop as claimed in claim 5, further including an accumulator (16) connected to the evaporator (14) and the compressor (2).

* * * * *